United States Patent
Park et al.

(10) Patent No.: US 9,815,174 B2
(45) Date of Patent: *Nov. 14, 2017

(54) METHOD FOR SURFACE TREATING A GOLF CLUB HEAD

(71) Applicant: DUNLOP SPORTS CO. LTD., Kobe-shi, Hyogo (JP)

(72) Inventors: Sharon J. Park, Irvine, CA (US); Daniel J. Stone, Long Beach, CA (US); Chih-Lung Liu, Kaohsiung (TW); Chin-Chun Tseng, Kaohsiung Hsien (TW); Jiann-Hsing Chuang, Kaohsiung (TW)

(73) Assignee: DUNLOP SPORTS CO. LTD., Kobe (JP)

( * ) Notice: Subject to any disclaimer, the term of this patent is extended or adjusted under 35 U.S.C. 154(b) by 434 days.

This patent is subject to a terminal disclaimer.

(21) Appl. No.: 14/320,339

(22) Filed: Jun. 30, 2014

(65) Prior Publication Data

US 2014/0310946 A1 Oct. 23, 2014

Related U.S. Application Data

(63) Continuation of application No. 14/069,126, filed on Oct. 31, 2013, now Pat. No. 8,968,115, which is a (Continued)

(30) Foreign Application Priority Data

Sep. 22, 2006 (TW) ................ 95135155 A

(51) Int. Cl.
*A63B 53/04* (2015.01)
*B24B 1/00* (2006.01)
(Continued)

(52) U.S. Cl.
CPC ............ *B24C 1/04* (2013.01); *A63B 53/04* (2013.01); *A63B 53/047* (2013.01); *B23P 17/00* (2013.01);
(Continued)

(58) Field of Classification Search
USPC ................ 473/324–350; 451/29, 38
See application file for complete search history.

(56) References Cited

U.S. PATENT DOCUMENTS

| 1,965,954 A | 7/1934 | Davis | |
| 2,106,980 A * | 2/1938 | Kavanaugh | B44C 1/221 451/31 |

(Continued)

FOREIGN PATENT DOCUMENTS

| JP | B-7-3006522 | 1/1973 |
| JP | B-73-006522 | 1/1973 |

(Continued)

OTHER PUBLICATIONS

Erik J. Barzeski, "Vokey Spin Milled Wedge Review," The Sand Trap.com, Jul. 12, 2005, http://thesandtrap.com/clubs/vokey_spin_milled_wedge_review.

(Continued)

*Primary Examiner* — Alvin Hunter
(74) *Attorney, Agent, or Firm* — Oliff PLC

(57) ABSTRACT

A method for surface treating a golf club head, includes: (a) forming a depression unit in the golf club head, the depression unit being indented inwardly from an outer surface of the golf club head, the outer surface being divided into a working area and a non-working area, the depression unit being formed in the working area; (b) filling the depression unit with a shielding material and covering the non-working area with a covering material; and (c) sandblasting the golf club head after step (b) and removing subsequently the (Continued)

shielding material from the depression unit and the covering material from the non-working area so as to form the working area into sandblasted and non-sandblasted regions that differ in gloss intensity.

12 Claims, 4 Drawing Sheets

Related U.S. Application Data continuation of application No. 13/584,555, filed on Aug. 13, 2012, now Pat. No. 8,597,138, which is a continuation of application No. 12/627,568, filed on Nov. 30, 2009, now Pat. No. 8,262,504, which is a continuation of application No. 11/907,903, filed on Oct. 18, 2007, now Pat. No. 7,780,549, which is a continuation of application No. 11/643,666, filed on Dec. 22, 2006, now Pat. No. 7,662,049.

(51) Int. Cl.
  B24C 1/00 (2006.01)
  B24C 1/04 (2006.01)
  B23P 17/00 (2006.01)
  B24C 1/06 (2006.01)

(52) U.S. Cl.
  CPC ............ *B24C 1/06* (2013.01); *A63B 53/0466* (2013.01); *A63B 53/0487* (2013.01); *A63B 2053/0445* (2013.01); *Y10T 29/49982* (2015.01); *Y10T 29/49986* (2015.01); *Y10T 29/49993* (2015.01)

(56) References Cited

U.S. PATENT DOCUMENTS

| | | | |
|---|---|---|---|
| 2,520,950 A | 9/1950 | Miller | |
| 2,926,913 A | 3/1960 | Stecher | |
| 4,430,416 A | 2/1984 | Goto et al. | |
| 4,529,203 A | 7/1985 | Ribaudo | |
| 4,610,581 A | 9/1986 | Heinlein | |
| 4,754,971 A | 7/1988 | Kobayashi | |
| 4,792,140 A | 12/1988 | Yamaguchi et al. | |
| 4,801,490 A | 1/1989 | Schuette | |
| 4,917,384 A | 4/1990 | Caiati | |
| 5,127,675 A | 7/1992 | Moss | |
| 5,190,289 A | 3/1993 | Nagai et al. | |
| 5,358,249 A | 10/1994 | Mendralla | |
| 5,437,088 A | 8/1995 | Igarashi | |
| 5,472,201 A | 12/1995 | Aizawa et al. | |
| 5,484,155 A | 1/1996 | Yamawaki et al. | |
| 5,601,501 A | 2/1997 | Kobayashi | |
| 5,611,742 A | 3/1997 | Kobayashi | |
| 5,665,013 A | 9/1997 | Kobayashi | |
| 5,674,132 A | 10/1997 | Fischer | |
| 5,676,605 A | 10/1997 | Kobayashi | |
| 5,688,186 A | 11/1997 | Michaels et al. | |
| 5,735,755 A | 4/1998 | Kobayashi | |
| 5,804,272 A | 9/1998 | Schrader | |
| 5,958,170 A | 9/1999 | Cetrangolo | |
| 6,187,849 B1 | 2/2001 | Nugent et al. | |
| 6,193,614 B1 | 2/2001 | Sasamoto et al. | |
| 6,346,052 B1 | 2/2002 | Chappell | |
| 6,402,636 B1 | 6/2002 | Chang | |
| 6,402,637 B1 | 6/2002 | Sasamoto et al. | |
| 6,475,099 B1 | 11/2002 | Sumitomo et al. | |
| 6,602,355 B2 * | 8/2003 | Alstrup | C23C 26/00 148/277 |
| 6,713,717 B2 | 3/2004 | Takeda | |
| 6,719,644 B2 | 4/2004 | Beach | |
| 6,916,253 B2 | 7/2005 | Takeda | |
| 6,945,307 B2 | 9/2005 | Tsai | |
| 6,981,923 B2 | 1/2006 | Chappell | |
| 7,040,000 B2 | 5/2006 | Takeda | |
| 7,080,560 B2 | 7/2006 | Takizawa et al. | |
| 7,258,627 B2 | 8/2007 | Chappell | |
| 7,568,983 B2 | 8/2009 | Gilbert | |
| 7,662,049 B2 * | 2/2010 | Park | A63B 53/04 473/330 |
| 7,780,549 B2 | 8/2010 | Park et al. | |
| 8,597,138 B2 * | 12/2013 | Liu | A63B 53/04 473/331 |
| 8,968,115 B2 * | 3/2015 | Park | A63B 53/04 473/331 |
| 2003/0032498 A1 | 2/2003 | Erb et al. | |
| 2004/0127300 A1 | 7/2004 | Roesgen et al. | |
| 2004/0192465 A1 | 9/2004 | Erb et al. | |
| 2005/0130761 A1 | 6/2005 | Vokey et al. | |
| 2006/0025233 A1 | 2/2006 | Lin | |
| 2007/0010346 A1 | 1/2007 | Gilbert et al. | |
| 2007/0149312 A1 | 6/2007 | Gilbert | |
| 2008/0076594 A1 | 3/2008 | Liu et al. | |
| 2008/0132351 A1 | 6/2008 | Ban et al. | |

FOREIGN PATENT DOCUMENTS

| | | |
|---|---|---|
| JP | A-02-234777 | 9/1990 |
| JP | A-06-114128 | 4/1994 |
| JP | A-10-248974 | 9/1998 |
| JP | A-10-277185 | 10/1998 |
| JP | A-2003-190335 | 7/2003 |
| JP | A-2003-293198 | 10/2003 |
| JP | A-2004-277811 | 10/2004 |
| JP | A-2007-325859 | 12/2007 |

OTHER PUBLICATIONS

Dec. 2, 2011 Office Action issued in U.S. Appl. No. 12/838,090.
Jul. 24, 2008 Office Action issued in U.S. Appl. No. 11/643,666.
Feb. 23, 2009 Office Action issued in U.S. Appl. No. 11/643,666.
Jul. 10, 2009 Office Action issued in U.S. Appl. No. 11/643,666.
Oct. 22, 2009 Notice of Allowance issued in U.S. Appl. No. 11/643,666.
Sep. 21, 2009 Office Action issued in U.S. Appl. No. 11/907,903.
Dec. 28, 2009 Office Action issued in U.S. Appl. No. 11/907,903.
Jul. 16, 2010 Notice of Allowance issued in U.S. Appl. No. 11/907,903.
May 11, 2012 Notice of Allowance issued in U.S. Appl. No. 12/627,568.
U.S. Patent and Trademark Office Rejection, dated Sep. 21, 2009 in U.S. Appl. No. 11/907,903.
Aug. 8, 2013 Notice of Allowance issued in U.S. Appl. No. 13/584,555.
Feb. 15, 2013 Office Action issued in U.S. Appl. No. 13/584,555.
Dec. 17, 2013 Office Action issued in U.S. Appl. No. 14/069,126.
Mar. 31, 2014 Notice of Allowance issued in U.S. Appl. No. 14/069,126.

* cited by examiner

METHOD FOR SURFACE TREATING A GOLF CLUB HEAD

CROSS-REFERENCE TO RELATED APPLICATION

This application is a continuation application of U.S. patent application Ser. No. 14/069,126, filed Oct. 31, 2013 which is a continuation application of U.S. patent application Ser. No. 13/584,555, filed Aug. 13, 2012 (now U.S. Pat. No. 8,597,138), which is a continuation application of U.S. patent application Ser. No. 12/627,568, filed Nov. 30, 2009 (now U.S. Pat. No. 8,262,504), which is a continuation application of U.S. patent application Ser. No. 11/907,903, filed Oct. 18, 2007 (now U.S. Pat. No. 7,780,549), which is a continuation application of U.S. patent application Ser. No. 11/643,666, filed Dec. 22, 2006 (now U.S. Pat. No. 7,662,049), which claims priority to Taiwanese Application No. 095135155, filed on Sep. 22, 2006, the contents of both of which are hereby incorporated by reference in their entireties.

BACKGROUND OF THE INVENTION

1. Field of the Invention

The invention relates to a method for surface treating a golf club head, more particularly to a method for forming an outer surface of a golf club head into regions that differ in gloss intensity.

2. Description of the Related Art

Conventional methods for enhancing the attractiveness of the outer surface of a golf club head include techniques, such as painting, plating, and physical vapor deposition. However, these conventional methods have a relatively high processing cost and a relatively low production yield due to their tendency of forming uneven gloss intensity on the outer surface of the golf club head.

SUMMARY OF THE INVENTION

Therefore, the object of the present invention is to provide a method for treating a surface of a golf club head that can overcome the aforesaid drawbacks associated with the prior art.

Accordingly, a method of this invention for surface treating a golf club head comprises: (a) forming a depression unit in the golf club head, the depression unit being indented inwardly from an outer surface of the golf club head, the outer surface being divided into a working area and a non-working area, the depression unit being formed in the working area; (b) filling the depression unit with a shielding material and covering the non-working area with a covering material; and (c) sandblasting the golf club head after step (b) and removing subsequently the shielding material from the depression unit and the covering material from the non-working area so as to form the working area into sandblasted and non-sandblasted regions that differ in gloss intensity.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
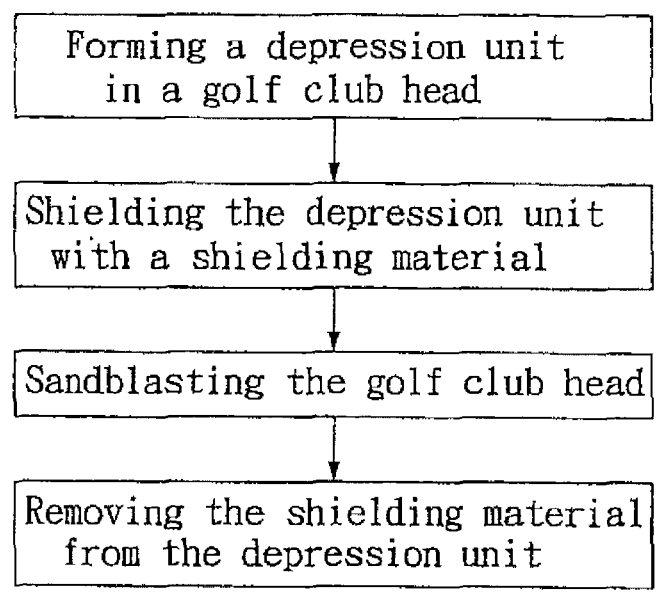
FIG. 1 is a flow chart illustrating consecutive steps of the preferred embodiment of a method according to the present invention for surface treating a golf club head.
Figure 2:
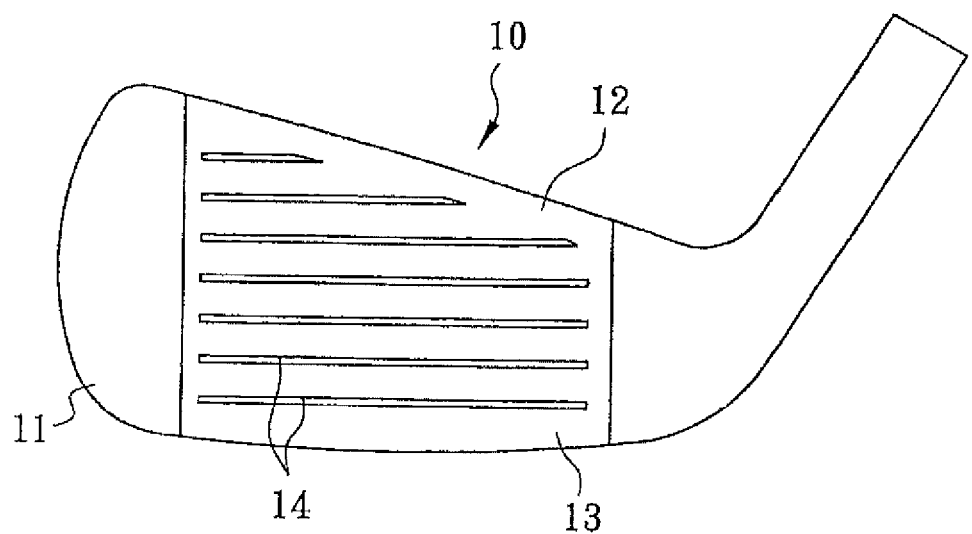
FIG. 2 is a schematic view of a golf club head in an initial state before being surface treated.
Figure 3:
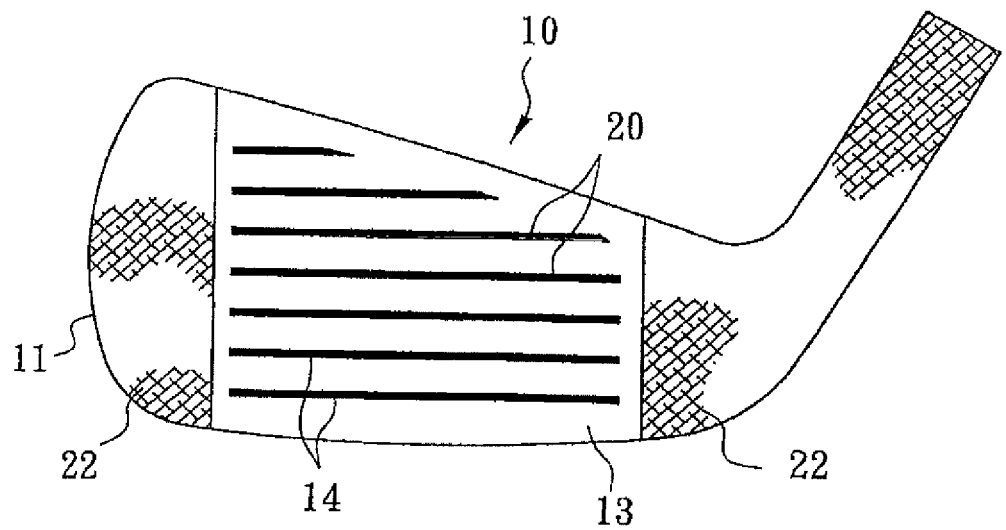
FIG. 3 is a schematic view of the golf club head in a state where a depression unit in the golf club head is shielded with a shielding material according to the preferred embodiment of this invention.
Figure 4:
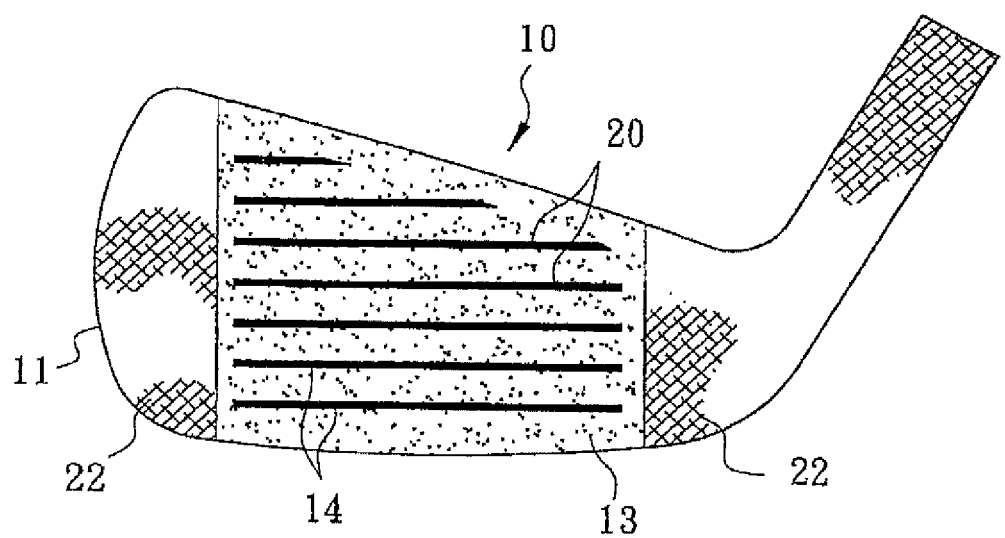
FIG. 4 is a schematic view of the golf club head in a state where a working area of an outer surface of the golf club head surrounding the depression unit is sandblasted according to the preferred embodiment of this invention.
Figure 5:
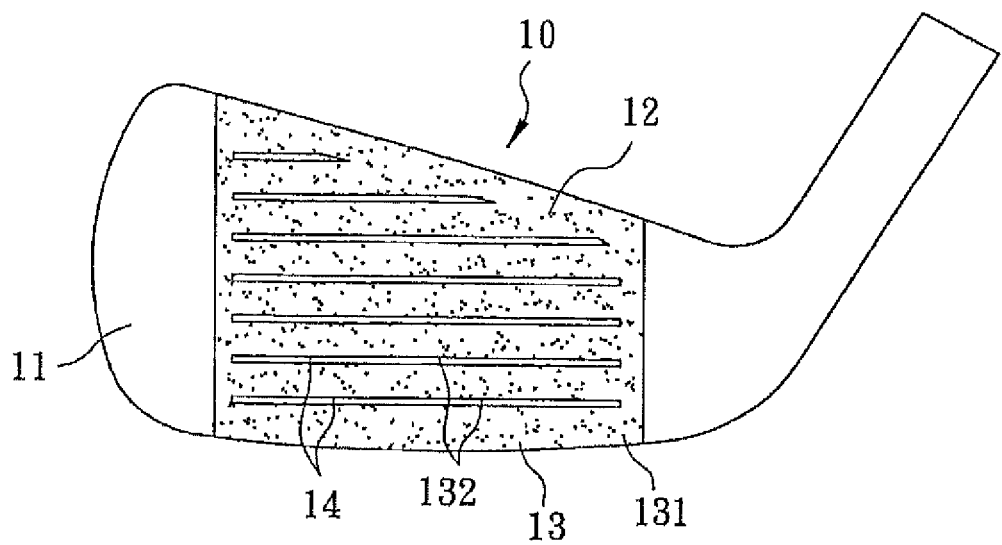
FIG. 5 is a schematic view of the golf club head in a state where the shielding material is removed after the working area of the outer surface of the golf club head is sandblasted according to the preferred embodiment of this invention.

FIG. 1 is a flow chart illustrating consecutive steps of the preferred embodiment of a method according to the present invention for surface treating a golf club head 10 (see FIG. 2) The method includes the steps of: (a) forming a depression unit 14 in the golf club head 10 (see FIG. 2), the depression unit 14 being indented inwardly from an outer surface 12 of the golf club head 10, the outer surface 12 of the golf club head 10 being divided into a working area 13 and a non-working area 11, the depression unit 14 being formed in the working area 13; (b) filling the depression unit 14 with a shielding material 20 and covering the non-working area 11 with a covering material 22 (see FIG. 3); and (c) sandblasting the golf club head 10 after step (b) (see FIG. 4) and removing subsequently the shielding material 20 from the depression unit 14 and the covering material 22 from the non-working area 11 (see FIG. 5) so as to form the working area 13 of the outer surface 12 into sandblasted and non-sandblasted regions 131, 132 that differ in gloss intensity.

Particularly, in this preferred embodiment, the method further includes polishing, plating, and anti-corrosion treating the outer surface 12 of the golf club head 10 before step (a) or after step (a) but before step (b). The depression unit 14 can be formed by carving techniques or by molding techniques.

The shielding material 20 is preferably selected from the group consisting of waxes, silicones, resins, gypsum, paints, and plastics, In this preferred embodiment, the shielding material 20 is a wax having a melting point ranging from 40 to 60° C.

The covering material is preferably a plastic sheet that can easily wrap around the non-working area 11 of the outer surface 12 of the golf club head 10.

In this preferred embodiment, the working area 13 to be sandblasted is the surface of a striking plate of the golf club head 10. The depression unit 14 is in the form of parallel line-shaped grooves.

During the shielding operation, a sufficient amount of wax is melted so as to fill the depression unit 14, and is subsequently cooled to become solidified.

When wax is used as the shielding material 20, removal of the shielding material 20 from the depression unit 14 can be conducted using a cleaning agent selected from the group consisting of dichloromethane, trichloromethane, chloroform, acetone, pentane, and pentanone. Preferably, the cleaning agent suitable for removing the shielding material 20 is dichloromethane. In addition, the cleaning operation is preferably conducted using a ultrasound cleaning equipment.

Figure 6:
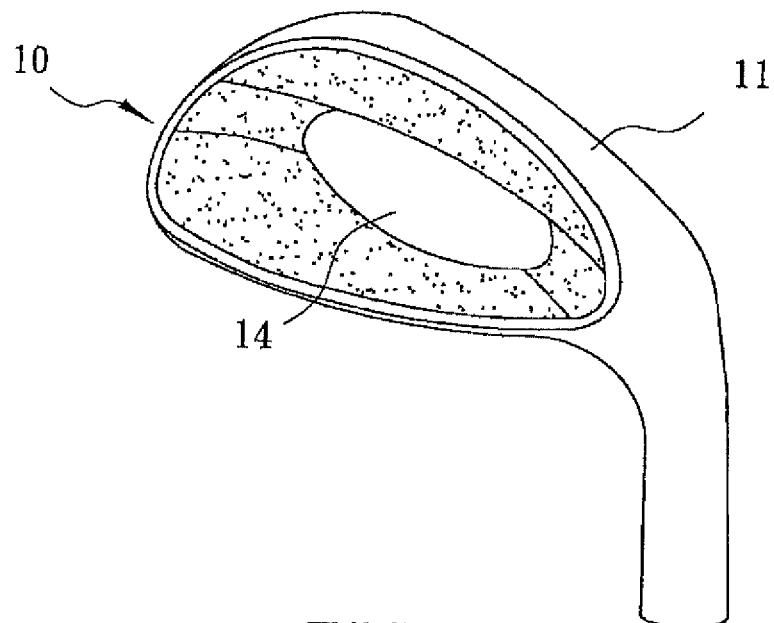
FIGS. 6 and 7 are schematic views illustrating different patterns of the depression unit formed on the working area of the outer surface of the golf club head according to the preferred embodiment of this invention.
Figure 7:
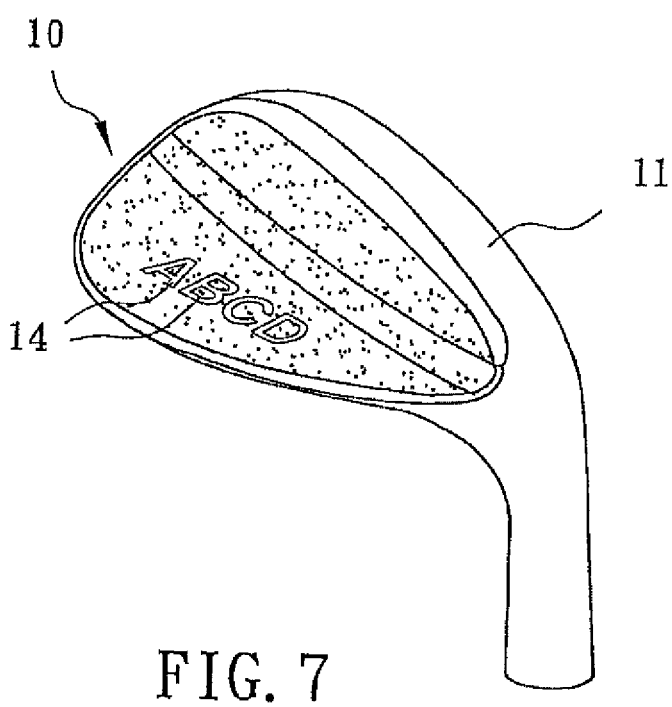

FIGS. 6 and 7 illustrate different patterns of the depression unit 14 formed on the working area 13 of the outer surface 12 of the golf club head 10 according to the preferred embodiment of this invention. In FIG. 6, the depression unit 14 is in the form of a back cavity in the golf club head 10. In Figure. 7, the depression unit 14 is in the form of English characters.

With the inclusion of the sandblasting techniques in the method of this invention for surface treating the golf club head 10, the aforesaid drawbacks associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for manufacturing an apparatus, the method comprising:
   plating the apparatus;
   applying an anti-corrosion treatment to the apparatus;
   after plating the apparatus and applying the anti-corrosion treatment, at least partially filling a depression area located on an outer surface of the apparatus with a shielding material; and
   sandblasting the outer surface of the apparatus including the depression area filled with the shielding material to create a non-sandblasted region coinciding with the location of the depression area and a sandblasted region distinct from the location of the depression area.

2. The method of claim 1, further comprising polishing the apparatus prior to the filling of the depression area with the shielding material.

3. A method for manufacturing a golf club head, the method comprising:
   forming a depression area using one of: a carving technique and a molding technique;
   applying an anti-corrosion treatment to the apparatus;
   after applying the anti-corrosion treatment, at least partially filling the depression area located on the outer surface of the golf club head with a shielding material; and
   sandblasting the outer surface of the golf club head including the depression area filled with the shielding material to create a non-sandblasted region coinciding with the location of the depression area and a sandblasted region distinct from the location of the depression area.

4. The method of claim 3, further comprising polishing the golf club head prior to the filling of the depression area with the shielding material.

5. The method of claim 3, further comprising plating the golf club head prior to the filling of the depression area with the shielding material.

6. A method for manufacturing a golf club head, the method comprising:
   applying an anti-corrosion treatment to the apparatus;
   after applying the anti-corrosion treatment, at least partially filling a depression area located on the outer surface of the golf club head with a shielding material, the depression area located adjacent to a non-working area;
   covering the non-working area with a covering material;
   sandblasting the golf club head including the depression area filled with the shielding material to create a first non-sandblasted region coinciding with the location of the depression area, a second non-sandblasted region coinciding with the location of the non-working area and a sandblasted region distinct from both the location of the depression area and the location of the non-working area.

7. The method of claim 6, further comprising polishing the club head prior to the filling of the depression area with the shielding material.

8. The method of claim 6, further comprising plating the golf club head prior to the filling of the depression area with the shielding material.

9. The method of claim 6, wherein the covering includes wrapping a plastic sheet around the non-working area.

10. The method of claim 6, wherein filling the depression area further includes: melting shielding wax to fill the depression area and subsequently cooling the shielding wax to create a solid shielding wax.

11. The method of claim 6, further comprising removing the shielding material using dichloromethane.

12. The method of claim 6, further comprising removing the shielding material using an ultrasound cleaning equipment.

* * * * *